United States Patent [19]

Kanbayashi

[11] Patent Number: 4,796,065
[45] Date of Patent: Jan. 3, 1989

[54] APPARATUS FOR DETECTING IMAGE DENSITY IN AN IMAGE-FORMING MACHINE

[75] Inventor: Hideyuki Kanbayashi, Toyokawa, Japan

[73] Assignee: Minolta Camera Kabushiki Kaisha, Osaka, Japan

[21] Appl. No.: 22,124

[22] Filed: Mar. 5, 1987

[30] Foreign Application Priority Data

Mar. 10, 1986 [JP] Japan .................. 61-53413

[51] Int. Cl.$^4$ .................................. G03G 15/00
[52] U.S. Cl. .................. 355/14 E; 355/14 D
[58] Field of Search .......... 355/14 D, 14 E, 300, 355/3 R; 356/446, 448; 250/572; 118/650

[56] References Cited

U.S. PATENT DOCUMENTS

| | | | |
|---|---|---|---|
| 4,313,671 | 2/1982 | Kuru ........................... | 355/14 |
| 4,505,572 | 3/1985 | Ashida et al. ............ | 355/14 R X |
| 4,525,630 | 6/1985 | Chapman ................. | 356/446 |
| 4,676,653 | 6/1987 | Strohmeier et al. ...... | 356/446 |
| 4,677,298 | 6/1987 | Zelmanovic et al. ..... | 356/446 |

FOREIGN PATENT DOCUMENTS 3029514 2/1981 Fed. Rep. of Germany.

*Primary Examiner*—A. T. Grimley
*Assistant Examiner*—Ed Pipala
*Attorney, Agent, or Firm*—Burns, Doane, Swecker & Mathis

[57] ABSTRACT

An apparatus for detecting image density in an image forming machine includes a first sensor for receiving mainly a regular reflecting light reflected from a reference toner image, and a second sensor for receiving mainly scattered reflecting light reflected from the reference toner image. The output signals from each sensor are compared with each other so as to produce a differential signal. Upon presetting the difference signal to be nil for a predetermined image density, an increase or a decrease of the reference toner image will invite a change of plus/minus sign of the differential signal.

5 Claims, 3 Drawing Sheets

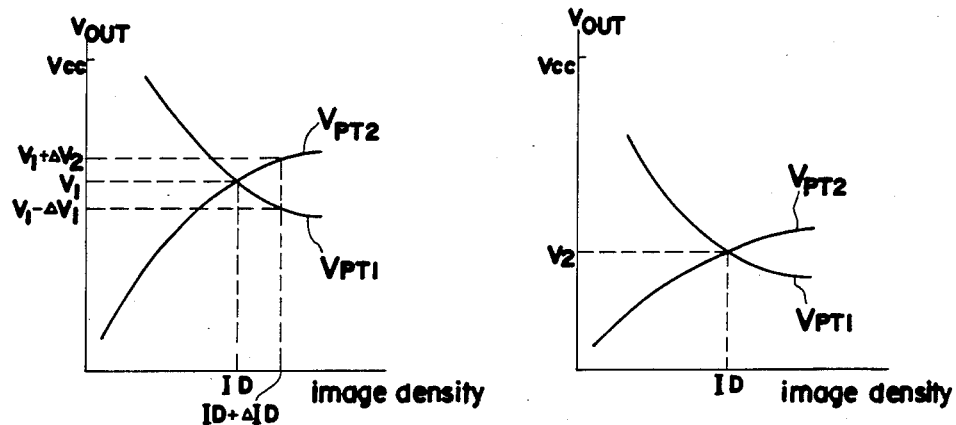
FIG.5 (a)
FIG.5 (b)
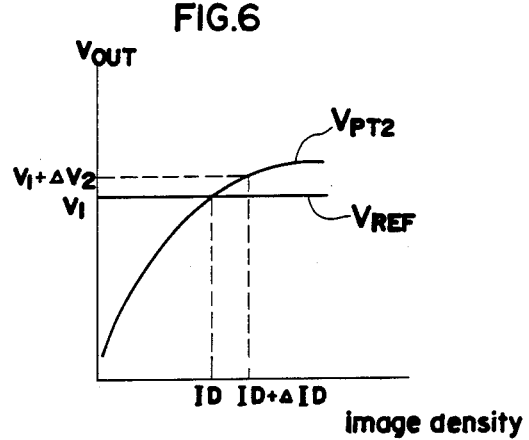
FIG.6
(CONVENTIONAL)

APPARATUS FOR DETECTING IMAGE DENSITY IN AN IMAGE-FORMING MACHINE

BACKGROUND OF THE INVENTION

This invention relates generally to improvements in image density detecting means. It relates more specifically to image density detecting and/or controlling mechanisms as usable in optoelectronic photo-copiers, image and character forming printers and the like image-reproducing and/or -producing machineries.

Since the present invention is most adventageously applied, to electrostatic photo-copiers, the following description will be substantially directed to the field of photo-copying technology. But, it should be noted, however, the present invention should not be limited only thereto. By adopting minor changes and modifications which may easily occur to those skilled in the art, the invention can be applied to image-forming apparatuses other than static electro-photocopiers, such as printers and the like mechanisms or machines.

As is commonly known, in the case of electrostatic photocopying machines, it is required to control the toner density so as to keep and maintain the density of copy images at a proper value at least throughout a batch of photocopying operations.

For control of the density of photo-copiers, it has already been proposed to provide on one end of the document-mounting glass plate a reference pattern of desired standard density. In order to produce toner images, having a corresponding density or tone to the reference pattern, on the photosensitive means, preferably a drum used as conventionally known, the toner image or images is/are subjected to a light projection by use of illuminous means such as LED. Then, the reflected light is sensed in terms of toner density by a density sensor (light-reception sensor) arranged in close proximity of the sensitive drum for control of toner supply quantity to a developer unit. In this case, either the regular reflection or scattered reflection is sensed and measured for determination of the image density.

It has been experienced, however, that in the case of the foregoing known process for determination of toner image density, there is a grave and inherent drawback such that when the sensor becomes fouled by the very existence of air-born toner particles floating in close proximity of and around the photosensitive drum, the toner image density as being measured must be demonstrated only in an erronous value. More specifically in this case, projection light onto the pattern plate and reflected input light from reference toner images will be considerably reduced, thereby the output from the sensor being subjected to reduction and resulting in that the correponding image density under control will be disadvantageously varied. For obviating the above drawback and according to another known proposal, correction is made against the fouling and the like troubles by use of a light quantity compensating sensor.

As an example, it is disclosed in U.S. Pat. No. 4,313,671 that the sensor output representing the reference toner image density is subjected to a correction, based upon the reflection density from the photosensitive surface of the drum before formation of toner images thereon. In this case, correction due to fouling of the above kind is made under such an assumption that the reflection density from the photosensitive drum surface without formation of tonered images is always constant.

SUMMARY OF THE INVENTION

It is a main object of the present invention to provide an improved density sensing and measuring apparatus subject to no influence of sensor fouling.

Another object is to provide an improved density sensity and measuring apparatus capable of performing the desired job irrespective of a fouling or unfouling condition at the operating surface of the sensor being in use, and always with the best operating result.

A still another object is to provide such a density detection apparatus as provided with an improved sensor which can operate irrespective of ambient temperature fluctuations.

For fulfillment of these and further objects and as a preferred aspect of the invention, an apparatus is proposed, as comprising in combination:

means for forming at least a reference toner image on a recording medium, preferably a photo-sensitive drum;

means for projecting light onto the reference toner image or images;

first sensor means for receiving mainly regular reflecting light(s) reflected from said reference toner image or images, thereby generating an output signal corresponsing thereto;

second sensor means for receiving mainly scattered reflecting light(s) reflected from said reference toner image or images, thereby generating an output signal corresponding thereto; and comparator means for comparing between the output from said first sensor means and the output from said second sensor means.

The foregoing improving technical idea is based upon the following observation that when light is projected onto toner image(s) on recording medium, preferably a photosensitive drum surface, the regular reflecting light therefrom will be more reduced with higher toner density. On the other hand, the scattered reflection will be more increased with higher toner density. In the present invention, these two contradicting characteristics existing in different reflecting lights are utilized in a unique manner for the realization of a highly improved process for the detection of image densities without invitation of density variation even with fouled sensors caused by floating existing toner particles.

In practice of the present invention, a reference toner image is formed on the surface of a recording medium, preferably a photosensitive drum or the like, for providing a standard or reference level for execution of the desired image density control. Then, two regular and scattered light reflections from the toner image are sensed respectively, and the thus sensed output signals are compared with each bther, to produce a differential signal. Upon presetting the difference signal to be nil for a predetermined image density, an increase or a decrease of the reference toner image will invite a change of the plus/minus sign of the differential signal. Therefore, as an example, when the toner dispensing quantity is increased or decreased depending upon the plus/minus change in the sign, the copy image density can be successfully maintained at a properly selected level. According to our further investigation, the regular and scattered reflections from the reference toner image represents a substantially similar characteristic. As an example, when the regular reflection is caused to decrease by 20% by sensor fouling, the scattered reflection will decrease equally by 20%. By utilization of this phenomenon, sensor fouling effects can be effectively corrected.

These and other objects, advantages and features of the invention will become more apparent from the following detailed description thereof taken in conjunction with the accompanying drawings, forming part of the specification, which illustrate substantially a specific embodiment of the invention.

BRIEF DESCRIPTION OF THE DRAWINGS

In the following description, like parts are designated by like reference numerals throughout the several drawings, wherein:

FIG. 5, (a) and (b), are characteristic curves of light reception elements acting as first and second image density sensors as adopted in the invention; and FIG. 6 is a similar graph showing an output characteristic curve of a conventional sensor.

PREFERRED EMBODIMENTS OF THE INVENTION

Figure 1:
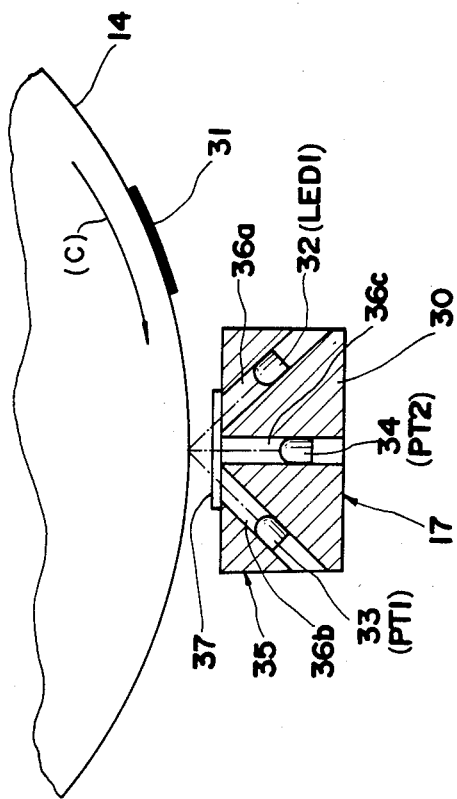
FIG. 1 is an enlarged elevational section showing an image density sensing mechanism as a part of the static electrophotocopying machine, shown in FIG. 2, adapted for execution of the inventive process.

In the following, substantially a preferred embodiment of the inventive electrophoto-copier machine will be described more in detail and with reference to the accompanying drawings.

(a). Structure of the copier

Numeral 1 represents a machine housing, in which a photosensitive drum 14 is rotatably mounted substantially at the central portion of the housing, a small arrow "c" showing the rotational direction of the drum.

Around the drum, there are arranged, for cooperation therewith, a static charger 10; a lens array 13; a developing unit 15; a transfer and separation charger 16; a AIDC-sensor (automatic toner image density control sensor or briefly image control sensor) 17; a cleaner box 18; and eraser lamp 19 one after another as shown.

There is further provided at a higher level than the drum, an exposure lamp 11 adapted for performing exposure jobs for the original document in the conventional manner.

At a higher level than the machine housing, there is provided a document table 22 which is arranged to perform conventional reciprocating motion as shown by small arrows (a) and (b). At the front end of document table 22, there is provided a reference pattern 12 adapted for performing image density control job, as will be later described more in detail.

Figure 2:
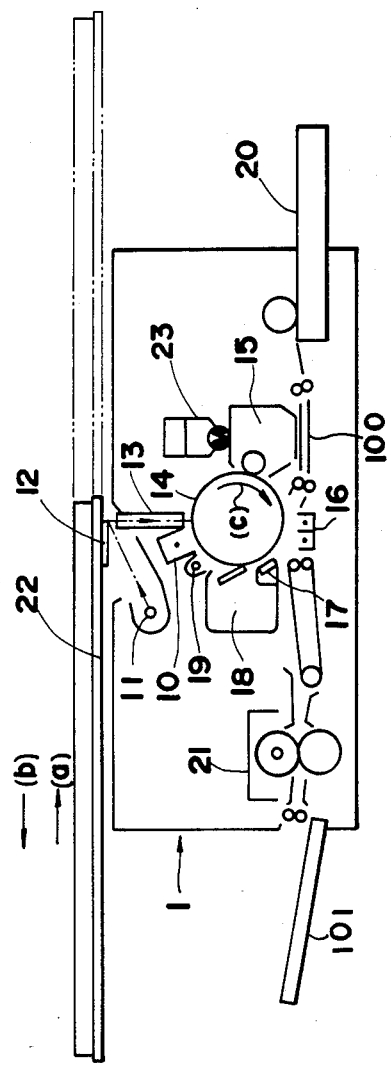
FIG. 2 is a schematic elevational arrangement of the static photo-copying machine, shown, however, on a considerably reduced scale.

For initiation of the photo-copying operation, document table 22 is caused to advance in the direction of small arrow "a" to its scanning start, or briefly "scan start" position, as shown in FIG. 2 in full line, and then executes scanning jobs relative to reference pattern 12 and the document. In accordance therewith, images are projected from exposure lamp 11 onto the drum surface 14 which has been precharged under the action of static charger 10, thus corresponding static latent images being formed thereon.

On the other hand, the uppermost sheet of copy papers, not shown, preserved in a stack within paper cassette 20 is taken out therefrom and conveyed to the transfer section 100, as conventionally known, in synchronism with the image-forming operation onto the drum 14 which is brought into effect by the table - advancing movement set forth just above and the corresponding rotary movement of the drum. Onto the copy paper, now brought to the transfer section 100, toner image or images formed under the action of developing unit 15 is/are transferred by transfer and separation charger 16. For this purpose, the latter is formed into two successive sections, which are bited as shown in FIG. 2. Then, the copy paper is statically separated from the drum surface under the action of the same charger 16, and thence conveyed to fixing section 21 for being subjected thereat to a thermo-fixing job. The thus copied paper is finally discharged onto a discharge tray shown at 101.

Meanwhile, the drum 14 is removed of residual toner by cooperation with cleaner box 18 and then removed of residual charges, so as to be ready for performing the next succeeding copying job, and so on. (b) Image density control Operation control of the foregoing copier machine is carried into effect via a microcomputer as at 24 in FIG. 3.

Figure 3:
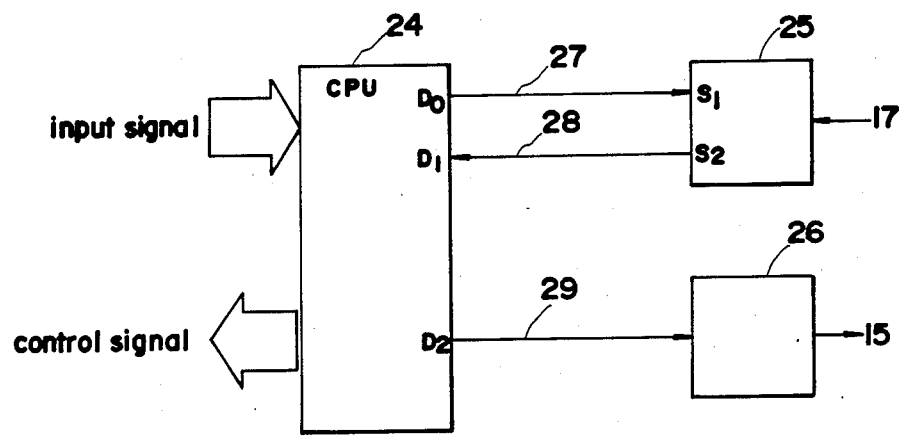
FIG. 3 is a block diagram showing a control circuitry as employed in the photo-copying machine shown in FIG. 2.
Figure 4:
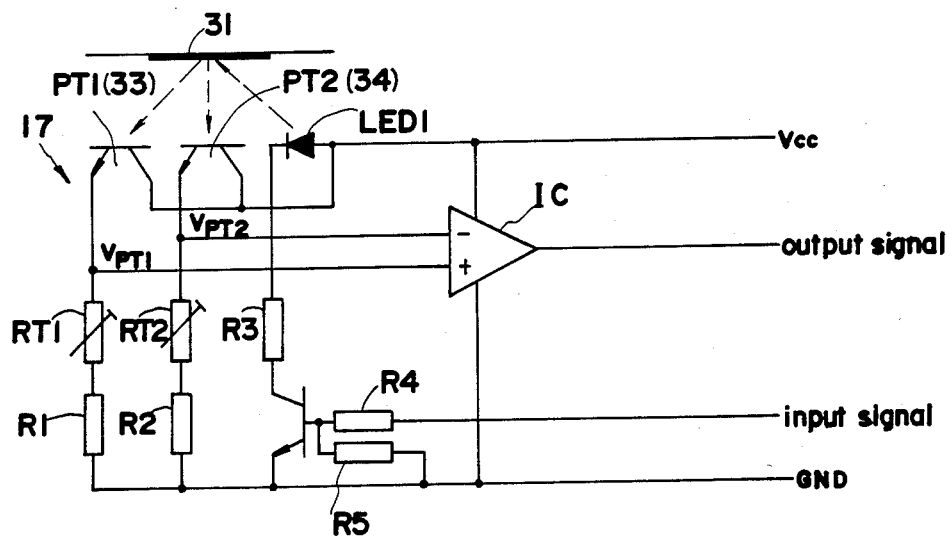
FIG. 4 is a more detailed schema of the control circuitry.

The desired image density control is executed by a AIDC - sensor 17, specifically shown in FIGS. 1, 3 and 4 in combination, exclusively serving for this service. More specifically, the microcomputer 24 will deliver a sensing - initiation signal via feeding line 27 and in sychromism with the arrival timing of a tonered image 31 on the drum surface, corresponding to the time the reference pattern 12 is brought into accurate registration with AIDC - sensor 17. Upon reception of this start - instruction signal at an inlet S1 of density detection circuit 25, FIG. 5, AIDC - sensor 17 detects the density of reference toner image 31, FIG. 1, so as to discriminate an occasionally appearing denser or thinner nature thereof, and will transfer a corresponding density signal to the computer 28 via a return line 28, FIG. 3. If lesser density than prescribed is detected, an enabling signal will be delivered from the computer 24 for operating a toner replenisher 26, FIG. 3, via an instruction line 29 for delivery of the toner from toner box 23, FIG. 2, to developing unit 15, FIG. 2, for a predetermined time period. By execution of such operation for each copying cycle, the image density can be maintained at a substatially constant level.

Now, specifically referring to FIG. 1, AIDC - sensor 17 comprises a light emission element, preferably LED, adapted for projecting light onto reference toner image 31 formed on drum surface 14; a first light-reception element 33, adapted for detecting the light regularly reflected from the reference toner image 31; a second light-reception element 34 and adapted for detecting the scattered light reflecting from the same image 31; and a supporter or holder 30 mounting these elements 32–34 in position. As may be well understood from the foregoing disclosure, both light reception elements 33; 34 must have preferably same or similar operating characteristics.

Luminous or light - emissible element 32 is so designed and arranged that the light emitted therefrom is directed towards the reference toner image 31 mounted in an oblique or angularly directed guide passage 36a. On the other hand, the light-reception element 33 is mounted in a separated guide passage 36b formed symmetrically to the foregoing passage 36a relative to a normal line to the drum surface and indeed, for the purpose of receiving mainly the regularly reflected light coming from the drum surface. Further, another light-reception element 32 is mounted in a further guide passage 36c extending most preferably in the normal direction relative to the drum surface, and indeed, for the purpose of receiving mainly scattered light from the reference image on the drum surface. As seen from FIG. 1, these guide passage or bores are formed through or with in the material of the holder 17 or 30. A transparent cover or protector is provided as shown at 37 in FIG. 1, for bodily closing respective inner open ends, directing towards the drum surface, of all the light passage bores 36a; 36b and 36c, for avoiding possible invasion of forign particles towards the working surfaces of respectively mounted elements 32-34. When an LED is used as the luminous or light-emissible element 32 and phototransistors are utilized as the light-reception elements 33 and 34, the density-detecting circuit may be designed and arranged in the manner as shown in FIG. 4. More specifically in FIG. 4, LED1 corresponds to the light-emissible element 32, PT1 represents the light-reception element 33 and PT2 represents the element 34. LED1 receives an enabling signal or more specifically a detection initiating instruction signal from microcomputer 24 in synchronized timing with arrival of the reference pattern toner image 31 which has been formed on the drum surface 14 at the sensing section or -zone. Phototransisters PT1 and PT2 are electrically connected with a common voltage source $V_{cc}$ and earthed through respective series-connected resistors Rl; RT1 and R2; RT2. The regular component of the reflected lights from reference toner image 31 is sensed at the first phototransistor PT1 arranged in the bore 36b forming a main light passage. On the other hand, the scattered component of the reflected lights from reference toner image 31 is sensed at the second phototransistor PT2 arranged in the bore 36c offset from the main light passage. Output voltages $V_{PT1}$; $V_{PT2}$ from these light-reception elements PT1 and PT2 are then fed to a comparator IC for comparison purpose, whereby adjudgement of the denser/lesser nature of the reference toner image is being performed. If collector currents of these transistors PT1 and PT2 are assumed to be I1 and I2, respectively, the following formulae will be established:

$$V_{PT1} = V_{cc} - I_1(R1 + RT1)$$

and $$V_{PT2} = V_{cc} - I_2(R2 + RT2)$$

It should be noted at this stage of description that the drum surface has been polished nearly to the degree of a mirror surface, while the toner represents a finely divided state showing a fine powder as is highly well known. As a result, light beams impinged upon the drum surface projected from LED1 will be reflected mainly in the form of a regular reflection, while those reflected from the toner will mainly take a form of scattered reflection. In fact, according to our experimental results, the output characteristics of said two light-reception elements PT1 and PT2 relative to toner density at the reference pattern toner image are such that the regular reflection component appearing at the first sensor PT1 will reduce with increase of toner density, thereby lowering correspondingly its output voltage, while the scattered reflection component appearing at the second sensor PT2 will increase with increase of the toner density, thereby intensifying correspondingly its output voltage.

In the chart shown at (a) of FIG. 5, output voltages $V_{PT1}$; $V_{PT2}$ at first and second sensor PT1; PT2 have been plotted against reference toner image density, showing the above described sensor characteristics. In this case, the image density is controlled to a specially selected reference density value ID which corresponds to the crossing point of two characteristic curves. In other words, RT1 and RT2 are so regulated that both sensor outputs attain a certain reference voltage level V1 at the density ID. With lesser density, $V_{PT1} > V_{PT2}$ and the output level at comparator IC will become high potential level "H". Or conversely, with higher density, $V_{PT1} > V_{PT2}$ and output level at the comparator will become low potential level "L". With such high or low output potential level "H" or "L", the toner supply is controlled ON/OFF, respectively for aiming the image density at ID.

In the following, an assumption is made that AIDC-sensor 17 has been fouled with floating toner particles deposited thereon. In this case, reduction of projecting or reflecting light quantity will be invited, thereby the output voltages $V_{PT1}$; $V_{PT2}$ of phototransistors PT1; PT2 will be caused to lower, as shown at (b) in FIG. 5. However, the ratio between regular and scattered reflecting light quantities will be subjected to substantially no alteration, even though the both light quantities have been jointly lowered, thus the output voltages $V_{PT1}$ and $V_{PT2}$ decreasing similarly. Therefore, although the reference voltage level is reduced from V1 to V2 ($<$V1), the image density corresponding to this new level V2 will remain at the reference value ID, thus being subjected to no alteration without any influence of toner fouling effect. In this way, any occurence of sensor fouling caused by floatingly attached toner particles will not disadvantageously invite alteration in image density, since the fouling generally occurs rather evenly over the sensor operating surface.

Naturally, the LED and the phototransistor have different thermal characteristics from each other. However, in the case of the present invention ill effects of fluctuating temperature conditions as frequently met within the interior space of the copier machine can be suppressed without use of normally adopted temperature compensation circuit means, if two phototransistors having similar characteristics have been used, as in the present embodiment.

With use of the foregoing image density control means so far shown and described, the sensitiveness of the sensor means to image density changes can be improved.

As an example, as shown in FIG. 5 at (a), it is now assumed that the reference image density has been changed from ID to (ID+$\Delta$ID), then, output voltage of phototransistor PT1 will be (V1−$\Delta$V1) and that appearing at phototransistor PT2 will become (V1+$\Delta$V2), thus the differential input to comparator IC being ($\Delta$V1+$\Delta$V2).

In comparison therewith, and in the case of a comparative conventional case, as shown in FIG. 6, wherein a certain predetermined reference voltage and sensor output are fed to comparator IC for comparison, the following results will be brought about as an example. In this case, if reference toner image density varies from ID to (ID+ΔID), then, the differential input to the comparator will be $\Delta V_2$. On the contrary, in the case of the foregoing inventive embodiment, the differential input voltage to comparator IC is $(\Delta V_1 + \Delta V_2)$ which is higher than $\Delta V_2$. Thus, in the case of the present invention, considerable improvements over the comparative prior art can be brought about.

Additionally to say that by adjustment of variable resistors RT1; RT2, various color toners, especially red, yellow or the like one, other than black one, which has/have higher reflecting factor(s), can be used with better results.

Finally, it may be well understood from the foregoing description, the sensor means as adopted in the invention, can be utilized in other appliances than static photocopiers, such as, by way of examples, an apparatus for measurement of toner quantity provisionally or permanently deposited on photosensitive or the like sensitive means adapted for thereby detecting operational or manufacturing troubles on or of static chargers, or for determination of operational deficiency caused by aging or the like cause occurring in various photosensitive means.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. Apparatus for detecting image density in an image forming machine comprising:
    means for forming at least a reference toner image on a recording medium;
    means for projecting light onto the reference image;
    first sensor means for receiving mainly a regular reflecting light reflected from said reference toner image, thereby generating an output signal corresponding thereto;
    second sensor means for receiving mainly a scattered reflecting light reflected from said reference toner image, thereby generating an output signal corresponding thereto, said second sensor means generating an output signal equal to that from said first sensor means when both sensor means receive a reflecting light reflected from an image having a predetermined density; and
    comparator means for comparing between the output from said first sensor means and the output from said second sensor means.

2. Apparatus for detecting image density in an image forming machine as claimed in claim 1, wherein said comparator means generates an output signal for supplying toner to said forming means.

3. Apparatus for detecting image density in an image forming machine as claimed in claim 1, wherein said first sensor means and said second sensor means are supported in a same holder.

4. Apparatus for detecting image density in an image forming machine as claimed in claim 3, wherein said holder is formed with a first guide passage which guides mainly the regular reflecting light into the first sensor means and a second guide passage which guides mainly scattered reflecting light into the second sensor means.

5. Apparatus for detecting image density in an image forming machine comprising:
    means for forming at least a reference toner image on a recording medium;
    means for projecting a light onto the reference image;
    first sensor means for receiving mainly a regular reflecting light reflected from said reference toner image, thereby generating an output signal corresponding thereto;
    second sensor means for receiving mainly a scattered reflecting light reflected from said reference toner image, thereby generating an output signal corresponding thereto, said second sensor means generating an output signal equal to that from said first sensor means when both sensor means receive reflecting light reflected from an image having a predetermined density;
    means for holding the projecting means, the first sensor means and the second sensor means integrally, said holding means including a first passage for guiding light from the projecting means angularly onto the reference image, a second passage for guiding light from the reference image symetrically to the first passage relative to a normal line to the recording medium into the first sensor means and a third passage for guiding light from the reference image into the second sensor means provided between the projecting means and the first sensor means; and
    comparator means for comparing between the output from said first sensor means and the output from said second sensor means.

* * * * *